United States Patent
Vrzic et al.

(10) Patent No.: US 10,313,887 B2
(45) Date of Patent: Jun. 4, 2019

(54) SYSTEM AND METHOD FOR PROVISION AND DISTRIBUTION OF SPECTRUM RESOURCES

(71) Applicants: Sophie Vrzic, Kanata (CA); Hang Zhang, Nepean (CA); Nimal Gamini Senarath, Ottawa (CA)

(72) Inventors: Sophie Vrzic, Kanata (CA); Hang Zhang, Nepean (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 15/168,411

(22) Filed: May 31, 2016

(65) Prior Publication Data

US 2016/0353422 A1    Dec. 1, 2016

Related U.S. Application Data

(60) Provisional application No. 62/220,693, filed on Sep. 18, 2015, provisional application No. 62/169,243, filed on Jun. 1, 2015.

(51) Int. Cl.
*H04W 16/02* (2009.01)
*H04W 16/04* (2009.01)
*H04W 16/14* (2009.01)

(52) U.S. Cl.
CPC ........... *H04W 16/02* (2013.01); *H04W 16/04* (2013.01); *H04W 16/14* (2013.01)

(58) Field of Classification Search
CPC . H04W 16/0204; H04W 16/06; H04W 16/08; H04W 16/10; H04W 16/12;
(Continued)

(56) References Cited

U.S. PATENT DOCUMENTS

| 6,842,783 B1 | 1/2005 | Boivie et al. |
| 7,925,756 B1 | 4/2011 | Riddle |

(Continued)

FOREIGN PATENT DOCUMENTS

| CN | 102710508 A | 10/2012 |
| CN | 103052054 A | 4/2013 |

(Continued)

OTHER PUBLICATIONS

International Search Report dated Jul. 28, 2016 for corresponding International Application No. PCT/CN2016/084396 filed Jun. 1, 2016.
(Continued)

*Primary Examiner* — Afsar M Qureshi

(57) ABSTRACT

There is provided systems and methods for Network Function Virtualization (NFV) in a control plane. The NFV framework is be used to define a plurality of virtual network functions (VNFs), each of which can correspond to a function enabling operation of a communication network. There is provided a method and system for managing a plurality of network slices in a communication network, the method comprising: instantiating a Global Control Plane set apart from the plurality of network slices, the Global Control Plane configured to at least partially manage each of the plurality of network slices.

10 Claims, 7 Drawing Sheets

(58) Field of Classification Search
CPC ..... H04W 4/005; H04W 4/028; H04W 48/20;
H04W 88/16; H04W 64/003; H04L
47/82; H04L 12/4641; H04L 12/911;
H04L 12/46
USPC .......................................................... 370/329
See application file for complete search history.

(56) References Cited

U.S. PATENT DOCUMENTS

| | | | |
|---|---|---|---|
| 9,392,471 | B1 | 7/2016 | Thomas et al. |
| 2003/0103510 | A1* | 6/2003 | Svanberg ............ H04L 12/4633 370/395.2 |
| 2003/0117954 | A1 | 6/2003 | De Neve et al. |
| 2003/0177221 | A1 | 9/2003 | Ould-Brahim et al. |
| 2004/0146036 | A1 | 7/2004 | Parantainen et al. |
| 2004/0203973 | A1 | 10/2004 | Khan |
| 2006/0085544 | A1 | 4/2006 | Chen et al. |
| 2007/0297367 | A1 | 12/2007 | Wang et al. |
| 2008/0130519 | A1* | 6/2008 | Bahl ........................ H04L 43/00 370/254 |
| 2009/0191888 | A1 | 7/2009 | Abedi |
| 2010/0069081 | A1 | 3/2010 | Mitra et al. |
| 2010/0122141 | A1 | 5/2010 | Arye |
| 2010/0216404 | A1* | 8/2010 | Hershey ............ H04W 72/0486 455/62 |
| 2011/0125905 | A1 | 5/2011 | Baucke et al. |
| 2011/0283017 | A1 | 11/2011 | Alkhatib et al. |
| 2012/0120887 | A1 | 5/2012 | Deaton et al. |
| 2012/0233302 | A1 | 9/2012 | Kallin et al. |
| 2013/0007232 | A1 | 1/2013 | Wang et al. |
| 2013/0143574 | A1 | 6/2013 | Teyeb et al. |
| 2013/0182601 | A1 | 7/2013 | Bandyopadhyay et al. |
| 2013/0183991 | A1 | 7/2013 | Bosch et al. |
| 2013/0201847 | A1* | 8/2013 | Chincholi ............ H04W 28/08 370/252 |
| 2013/0212285 | A1 | 8/2013 | Hoffmann et al. |
| 2013/0225123 | A1 | 8/2013 | Adjakple et al. |
| 2014/0086177 | A1 | 3/2014 | Adjakple et al. |
| 2014/0086194 | A1* | 3/2014 | Sugahara ............ H04W 28/16 370/329 |
| 2014/0269295 | A1 | 9/2014 | Anumala |
| 2014/0282769 | A1 | 9/2014 | Salem et al. |
| 2014/0301192 | A1 | 10/2014 | Lee et al. |
| 2014/0317261 | A1 | 10/2014 | Shatzkamer et al. |
| 2014/0376555 | A1 | 12/2014 | Choi et al. |
| 2015/0043382 | A1 | 2/2015 | Arora et al. |
| 2015/0063112 | A1 | 3/2015 | Wu et al. |
| 2015/0104172 | A1 | 4/2015 | Wang et al. |
| 2015/0154258 | A1 | 6/2015 | Xiong et al. |
| 2016/0044702 | A1 | 2/2016 | Centonza et al. |
| 2016/0352528 | A1 | 12/2016 | Law et al. |
| 2017/0079059 | A1 | 3/2017 | Li et al. |
| 2017/0104609 | A1 | 4/2017 | McNamee et al. |
| 2017/0126492 | A1 | 5/2017 | Law et al. |
| 2017/0127427 | A1 | 5/2017 | Claridge et al. |
| 2017/0208019 | A1* | 7/2017 | Shimojou ........... H04L 12/4641 |
| 2017/0257870 | A1 | 9/2017 | Farmanbar |

FOREIGN PATENT DOCUMENTS

| | | |
|---|---|---|
| CN | 103548370 A | 1/2014 |
| CN | 104243301 A | 12/2014 |
| CN | 104270441 A | 1/2015 |
| EP | 1729532 A1 | 12/2006 |
| EP | 2493235 A1 | 8/2012 |
| EP | 2627140 A1 | 8/2013 |
| EP | 2667541 A1 | 11/2013 |
| EP | 2866495 A2 | 4/2015 |
| GB | 2512900 A | 10/2014 |
| JP | 2009542091 A | 11/2009 |
| JP | 2011508474 A | 3/2011 |
| JP | 2013541289 A | 11/2013 |
| JP | 2014045390 A | 3/2014 |
| JP | 2014090501 A | 5/2014 |
| JP | 2015080204 A | 4/2015 |
| KR | 20130084680 A | 7/2013 |
| WO | 2009071431 A1 | 6/2009 |
| WO | 2011032595 A1 | 3/2011 |
| WO | 2011086250 A1 | 7/2011 |
| WO | 2011144538 A1 | 11/2011 |
| WO | 2013093462 A1 | 6/2013 |
| WO | 2013170045 A2 | 11/2013 |
| WO | 2014086978 A1 | 6/2014 |
| WO | 2014090997 A1 | 6/2014 |
| WO | 2014117135 A2 | 7/2014 |
| WO | 2014121471 A1 | 8/2014 |
| WO | 2014160228 A1 | 10/2014 |
| WO | 2014180513 A1 | 11/2014 |
| WO | 2014197778 A1 | 12/2014 |
| WO | 2015031512 A1 | 3/2015 |
| WO | 2015057960 A1 | 4/2015 |

OTHER PUBLICATIONS

International Search Report dated Nov. 14, 2016 for corresponding International Application No. PCT/CN2016/099726 filed Sep. 22, 2016.
International Search Report dated Jul. 15, 2016 for corresponding International Application No. PCT/CN2016/084398 filed Jun. 1, 2016.
3GPP TR 22.891 V0.1.0 (Apr. 2015),3rd Generation Partnership Project;Technical Specification Group Services and System Aspects;Feasibility Study on New Services and Markets Technology Enablers; Stage 1(Release 14), total 26 pages.
European Search Report dated Nov. 22, 2017 for corresponding European patent application No. 16802559 filed Jun. 1, 2016.
Extended European Search Report dated Mar. 1, 2018 for corresponding Patent Application No. 16802560.9 filed Jun. 1, 2016.
Partial Supplementary European Search Report dated Apr. 19, 2018 for corresponding European Application No. 16802558.3 filed Jun. 1, 2016.
Liang et al., "Wireless Virtualization for Next Generation Mobile Cellular Networks", IEEE Wireless Communications, pp. 61-69, Feb. 1, 2015.
Liang et al., "Wireless Network Virtualization: A Survey, Some Research Issues and Challenges", IEEE Communications Surveys & Tutorials, vol. 17(1), Jan. 1, 2015.
Hamid Farmanbar et al.,"Traffic Engineering for Software-Defined Radio Access Networks", 2014 IEEE Network Operations and Management Symposium, May 5, 2014.
Extended European Search Report dated Feb. 27, 2018 for corresponding European Application No. 16802562.5 filed Jan. 6, 2016.
Extended European Search Report dated Mar. 27, 2018 for corresponding European Application No. 16802556.7 filed Jun. 1, 2016.
Takuya Shimojyo, et al., Future Mobile Core Network for Efficient Service Operation, Network Softwarization, 2015 1st IEEE Conference on, Apr. 2015.
Tsuyoshi Ogura et al.,"A Study on Congestion Avoidance Technology using Multiple Virtual Networks", IEICE technical report, vol. 114 No. 28, May 8, 2014.
NGMN Alliance; NGMN 5G White Paper Version 1.0; Feb. 17, 2015, pp. 45-48.
3GPP Technical Specification Group Services and System Aspects; Architecture Enhancements for Dedicated Core Networks; Stage 2 3GPP TR 23.707 V13.0.0, Feb. 17, 2015, pp. 9-21.
International Search Report for International Application No. PCT/CN2016/084399 dated Aug. 26, 2016.
International Search Report for International Application No. PCT/CN2016/084401 dated Aug. 24, 2016.
International Search Report for International Application No. PCT/CN2016/084405 dated Aug. 11, 2016.
U.S. Appl. No. 15/169,383, filed May 31, 2016. Not yet published.
U.S. Appl. No. 15/169,444, filed May 31, 2016. Not yet published.
3GPP TR 22.891 entitled "Study on New Services and Markets Technology Enablers," Release 14, Version 1.2.0, Jan. 20, 2016 (updated Sep. 2016).

(56) References Cited

OTHER PUBLICATIONS

ETSI GS NFV 001 entitled "Network Function Virtualization (NFV); Use Cases", Oct. 2013.
ETSI GS NFV 002 entitled "Network Function Virtualization (NFV); Architectural Framework", Oct. 2013.
3GPP document TR 23.707, "Architecture Enhancements for Dedicated Core Networks; Stage 2," V. 13.0.0, Dec. 17, 2014.

* cited by examiner

SYSTEM AND METHOD FOR PROVISION AND DISTRIBUTION OF SPECTRUM RESOURCES

CROSS-REFERENCE TO RELATED APPLICATIONS

This application claims the benefit and priority of U.S. Provisional Applications 62/169,243 and 62/220,693, filed Jun. 1, 2015 and Sep. 18, 2015, respectively. The foregoing applications are incorporated by reference herein in their entirety.

FIELD OF THE INVENTION

The present invention pertains to the field of communication networks and in particular to a system and method for provision and distribution of spectrum resources.

BACKGROUND

Managing competing demands from different use case needs makes network planning and deployment difficult.

In building advanced networks, such as those to support future developments in wireless networks (including next generation wireless, or so-called Fifth Generation (5G) networks), network slicing provides the ability to create isolated virtual networks over which different traffic flows can travel. As a result of that we turn to technologies like Network Function Virtualization, Software Defined Networking, and the like, which allow the creation of different network slices. Using SDN and NFV we can create slices and populate them with the required functions. Each of these slices can have the properties required by the traffic flows they serve. This allows one network slice to have low latency and another network slice to be ultra-reliable.

However, there is a need for a system and method for the provision and distribution of spectrum resources, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present invention provides a system and method for the provision and distribution of spectrum resources. In accordance with embodiments of the present invention, there is provided a method for provisioning and distributing spectrum resources in a communication network which includes receiving, at a spectrum negotiator, a request for additional spectrum resources for a particular network slice. The method further includes transmitting a request for the additional spectrum resources and receiving, in response to the transmitted request, an offer for at least some of the requested additional spectrum resources.

In some embodiments, the method further includes negotiating to obtain at least some of the requested additional spectrum resources. In some embodiments, the method further includes allocating at least some additional spectrum resources to the particular network slice and/or checking a resource request policy in light of the request for additional spectrum resources.

In accordance with embodiments of the present invention, there is provided a method for obtaining additional spectrum resources which includes detecting, at the scheduler, an indication of a spectrum resource overload condition and transmitting a request for additional spectrum resources. In some embodiments, the indication of the spectrum resource overload condition can be a buffer overload condition or a queue length condition or an observed condition that is a predictor of increased network traffic.

In accordance with embodiments of the present invention, there is provided a system for provisioning and distributing spectrum resources in a communication network which includes a spectrum negotiator configured to transmit a request for additional spectrum resources, the spectrum negotiator operatively connected with a particular network slice. The system further including a spectrum manager configured to receive and act upon the request for provision of at least some of the requested additional spectrum resources.

In some embodiments, the spectrum negotiator and the spectrum manager are configured to negotiate the provision of at least some of the requested additional spectrum resources.

In some embodiments, the spectrum negotiator is instantiated within the particular network slice while in other embodiments the spectrum negotiator is instantiated within an access point communicatively connected with the particular network slice. In other embodiments, the spectrum negotiator is instantiated within the communication network separate from the particular network slice and separate from an access point communicatively connected with the particular network slice.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
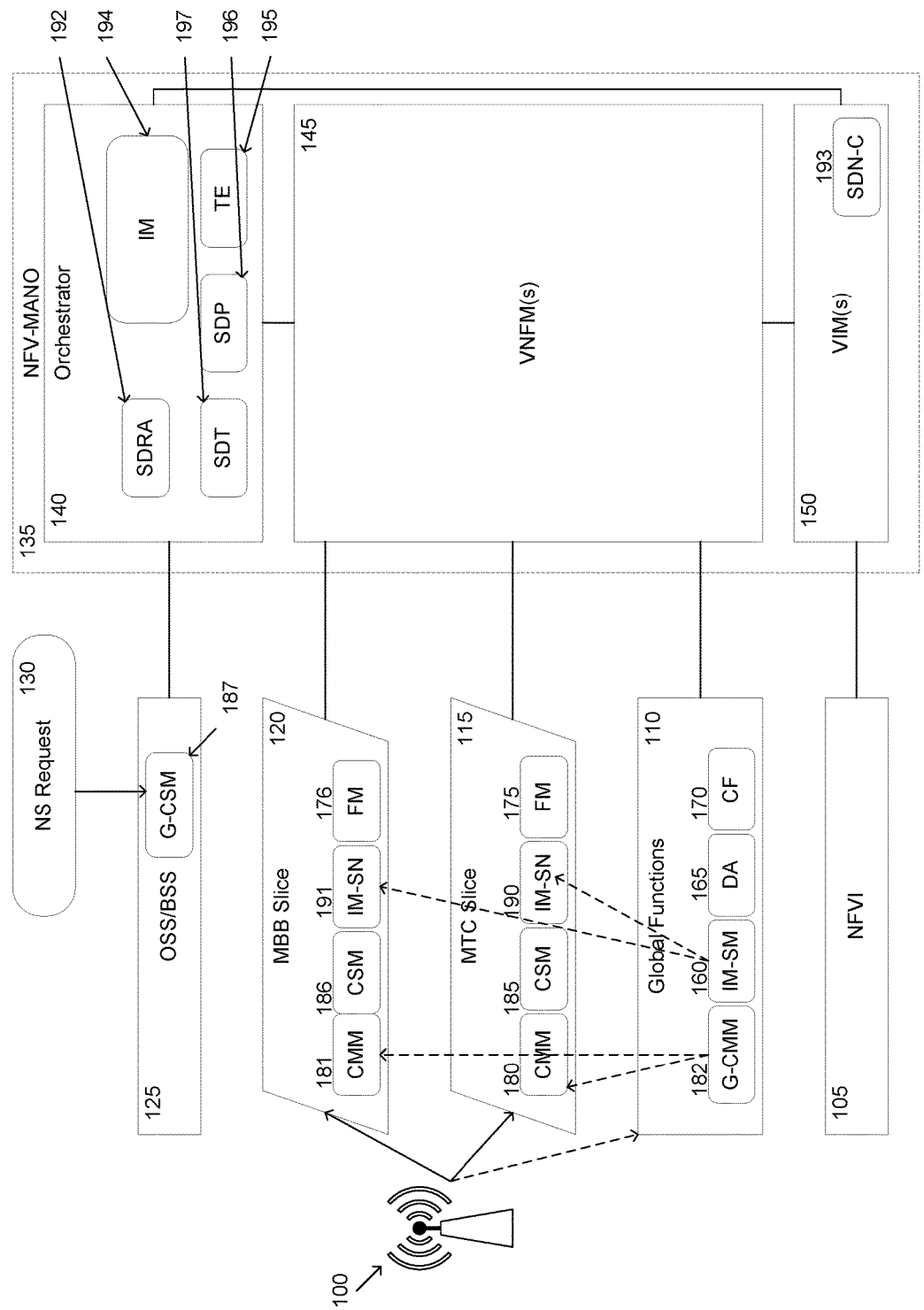
FIG. 1 illustrates an overview of a communication network architecture in accordance with embodiments of the present invention.

As used herein, a "network" or "communication network" may service various devices including but not necessarily limited to wireless devices. Such a network may include a radio access portion and backhaul portion. The network may further comprise various virtualized components as will become readily apparent herein. A primary example of such a network is 5G network which is reconfigurable and capable of network slicing, as described below.

Network slicing refers to a technique for separating different types of network traffic which can be used in reconfigurable network architectures, such as networks employing Network Function Virtualization (NFV). A network slice (as defined in 3GPP TR 22.891 entitled "Study on New Services and Markets Technology Enablers") is a collection of logical network functions that supports the communication service requirements of a particular network service. One use of network slicing is in the core network. Through the use of network slicing, different service providers can have distinct core networks that run on the same physical set of network and computing resources. Network slicing can also be used to create independent virtual networks dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

In a conventional mobile network, a device is associated with a Mobility Management Entity (MME) during the attach process. The MME associated with the mobile device is selected from a pool of MMES by a selection function in a network infrastructure component. In contrast with a network having a single network that must be designed to meet the needs of each wireless device, network slicing allows the instantiation of separate network slices on the physical network resources. Each of the slices can be created so that it has characteristics directed towards the particular requirements of each of the different network services. The use of network slices allows for the separation of different types of traffic, which each may have different packet processing requirements and QoS requirements. Network slicing may correspond to the allocation of pooled resources to offer different services to different customers or groups of customers, such that different services are supported by different customized virtual networks, where the different customized virtual networks are substantially separate from one another from the customer's point of view. The pooled resources may be commercial-off-the-shelf hardware components capable of configuration through virtualization approaches, such as NFV, in order to support various network functionalities for supporting the operations of the network slices.

The Network Function Virtualization (NFV) framework can be used to define a plurality of virtual network functions (VNFs), each of which can correspond to a function enabling operation of a communication network. For example a VNF can provide the functions of a router, switch, gateway, firewall, load balancer, server and the like. The function is virtualized in the sense that it may utilize a set of virtual resources, such as computing, storage and networking resources, rather than utilizing dedicated hardware resources. As such, VNFs may be instantiated on an as-needed basis using available virtual resources. NFV and virtual network functions architecture is described in ETSI GS NFV 001 entitled "Network Function Virtualization (NFV); Use Cases", October 2013 and ETSI GS NFV 002 entitled "Network Function Virtualization (NFV); Architectural Framework", October 2013, for example.

To provide context to aid in the understanding of network slicing, and the concept of a network slice, it is helpful to understand that in heterogeneous networks in addition to a plurality of different types of nodes covering different locations, different infrastructure providers may own different parts of what is considered as an access network (or even parts of a core network). A Telecommunications Service Provider (TCSP), who provides service to a customer, such as an M2M virtual network operator (VNO) (which may also be referred to as an M2M SP) or another virtual service provider, may wish to provide a simple network to the M2M SP. As such, the TCSP will create a virtual network having virtual nodes and virtual links between the nodes. The M2M SP only needs to interact with the virtual network (VN) resources and operates as a VNO. However, the VN (both nodes and links) need to be mapped to physical infrastructure. The VN may only use a subset of the physical nodes, and each physical node that the VN uses may not be fully used by that VN. It should also be understood that the M2M SP may make use of more than one TCSP, allowing it to create a network formed from a plurality of slices across different networks, effectively having a network slice that is a superset of the resources of a single TCSP. If certain bandwidth requirements are set for each logical link, then percentages of physical links are allocated to create the virtual link. This may also include aggregating links to create a logical link of greater capacity than a single physical link. Network slices are the collection of the allocation of the resources in what may be different networks. A network slice, from the perspective of an infrastructure provider may only include resources in the infrastructure provider network. From the perspective of the M2M SP, the network slice is a substantially seamless aggregation of all network slices that the M2M SP uses which is analogous to the VN. The TCSP deals with seamlessly connecting the different network slices of infrastructure provider resources, along with network slices from the TCSP resources, to create the M2M VN. It should be understood that at various points in time, the total allocation of network slices for different resources may not add up to 100%. If the value is less than 100% it means that the resource is not fully utilized. If it exceeds 100% it may be a network design choice knowing that there is a very low likelihood that all customers will be using a resource at the same time. It should be understood that the size and nature of different network slices can vary with time as new resources come online or as existing resources are re-allocated. The M2M SP may typically be unaware of the changes in the infrastructure.

In some embodiments, network slicing relates to the ability of a network, such as a 5G communication network accessible by wireless devices, to provide multiple logical network slices on demand, with each network slice operating as a substantially separate network viewed as a service. The capabilities and operating parameters of each network slice may be customized to the service requirements. Configuration of the network slices may be based on software defined networking, network function virtualization and network orchestration.

According to embodiments of the present invention, there is provided a system and a method for the provision and distribution of spectrum resources across a plurality of network slices. In particular, spectrum resources are resources that are available to a particular network operator, for example spectrum that is owned, leased, borrowed or otherwise available to the network operator at a given time. The provision and distribution of the available spectrum resources can be provided substantially in real time. Spectrum resource requirements can be determined and distributed on an as needed basis, thereby attempting to substantially optimize the available spectrum resources for improved performance of the network. The real time provision of spectrum resources can be enabled by interaction between a slice specific Spectrum Negotiator and a global Spectrum Manager. The slice specific Spectrum Negotiator provides information indicative of spectrum resource requirements of the network slice associated therewith. The global Spectrum Manager is responsive to plural spectrum negotiators of multiple or potentially all network slices associated with the network, and manages the provision and distribution of the spectrum resources to the network slices based on interaction with the respective Spectrum Negotiators.

In order to provide context, according to embodiments of the present invention, the communication network architecture to which this spectrum resource management configuration can be applied is based on a Network Function Virtualization (NFV) framework. The NFV Management and Orchestration (MANO) entity is used to instantiate the necessary network functional components in order to suitably provide the service indentified by a Network Service (NS) request. The instantiation of a network service request is described by a Virtual Network Function Forwarding Graph (VNFFG) which defines the set of network functions that are required to provide the requested service. The VNFFG contains a Network Forwarding Path (NFP) that defines a sequence of actions that are to be performed, for example by a collection of VNFs, to provide the requested service.

FIG. 1 illustrates an overview of a communication network architecture in accordance with embodiments of the present invention. The NFV-MANO entity 135 includes an Orchestrator function 140, a Virtual Network Function Manager (VNFM) function 145 and a Virtual Infrastructure Manager (VIM) function 150. According to embodiments, the functionality of the Orchestrator function 140, VNFM function 145 and VIM function 150 can be as defined in ETSI GS NFV 001 and ETSI GS NFV 002, for example.

According to embodiments, the VIM function 150 is configured to manage the Network Function Virtual Infrastructure (NFVI) 105 which can include physical infrastructure, virtual resources and software resources in a NFV-based network. For example physical infrastructure can include servers, storage devices and the like and virtual resources can include virtual machines. According to embodiments, there can be a plurality of VIM functions instantiated within a particular NFV architecture, wherein each VIM function is responsible for the management of its respective NFVI.

According to embodiments, the VNFM function 145 can be configured to manage the Virtual Network Functions (VNF) and can manage the lifecycle of the VNFs. For example the VNFM function 145 can create, maintain and terminate VNF instances, which can be installed on virtual machines that are created and managed by the VIM function 150. The VNFM function 145 can also be configured to provide fault, configuration, accounting, performance and security management (FCAPs) of the VNFs. In addition, the VNFM function 145 can be configured to scale-up and scale-down one or more of the VNFs which can result in the scaling-up and scaling-down of the usage of the central processor(s) that is providing the computational power for the realization of the VNFs. In some embodiments, each VNFM function manages a separate VNF or a single VNFM function manages multiple VNFs.

According to embodiments the Orchestrator function 140 can be configured to coordinate, authorize, release and engage the NFVI resources by interaction with the VIM function 150. The Orchestrator function 140 further is configured to create end-to-end service between different VNFs by interaction with the VNFM function 145.

With further reference to FIG. 1, a plurality of network slices and a Global Control Plane 110 used for network slice management in accordance with embodiments of the present invention are illustrated. The Global Control Plane 110 controls functions across multiple and potentially all the network slices. The Global Control Plane 110 may be regarded as a separate network slice in some embodiments. The illustrated network slices include at least one Mobile Broadband (MBB) network slice 120 and at least one Machine Type Communication (MTC) network slice 115, although other types of network slices or other combination of network slices may be provided.

In various embodiments, both the Global Control Plane functions and each network slice specific control plane functions may be instantiated at an arbitrary location in the network by the NFV-MANO entity in order to provide connection management across a plurality or all of the network slices. The location of these functions may depend on performance factors such as delay requirements of different network services being provided.

The functions configured within the Global Control Plane 110 can include the Global Connection and Mobility Management (G-CMM) function 182, Infrastructure Management (IM) function which can contain a manager function and a negotiator function for obtaining computing, storage and network resources for core network functions. In some embodiments the IM function contains a Spectrum Manager (IM-SM) function 160 which is configured to manage spectrum resources that are available to a particular network operator, for example owned, leased, borrowed or otherwise available to the network operator at a point in time. The Global Control Plane 110 can also include a Data Analytics (DA) function 165 and Cache and Forwarding (CF) function 170.

In more detail, the G-CMM function 182 is responsible for maintaining a list of the instantiated network slices and the parameters associated with each network slice (e.g. Operator ID, service type, etc.). The G-CMM function 182 is further responsible for maintaining a pool of Connection and Mobility Management (CMM) functions, wherein each CMM function is instantiated as a local or network slice specific function. The G-CMM function 182 is further responsible for initial association to a network slice.

When implemented, a Data Analytics (DA) function 165 can be assigned responsibility for collecting statistics and data across multiple and potentially all network slices. These statistics and data collected can be used in order to manage, evaluate operation conditions and the like or a combination thereof, for each of the network slices.

The Cache and Forward (CF) function 170 is responsible for management of the cached content across multiple and potentially all network slices.

In embodiments, the network architecture further includes a Global Customer Service Management (G-CSM) function 187 which is configured to receive Network Service (NS) Requests 130 and act upon same through communication with the Orchestrator function 140 of the NFV-MANO entity 135. For example, a Network Service Request may be indicative of one or more User Equipment requesting connection to the communication network. The G-CSM function 187 is responsible for maintaining a pool of Customer Service Management (CSM) functions, wherein each CSM function is instantiated as a local or network slice specific function. The G-CSM function 187 is further responsible for keeping track of charging, for example billing, across multiple or potentially all network slices. The G-CSM function 187 can be configured to monitor network slices and provide feedback to the Orchestrator function 140 about the performance of a network slice thereby enabling optional fine tuning of the network and computing resources for a particular network slice, as managed by the VNFM function 145 and the VIM function 150. The fine tuning can provide for the substantial optimization of the operation of the respective network slices in terms of, for example, computing resource usage.

In some embodiments, the G-CSM function 187 can be integrated within the Operational Support System/Business Support System (OSS-BSS) 125. The OSS can include functions that support back-office activities which aid in operating a communication network, as well as provisioning and maintaining customer services and the like. The BSS can include functions that support customer-facing activities, for example billing order management, customer relationship management, call centre automation and the like. In this embodiment, the G-CSM function 187 can communicate with the Orchestrator function 140 using the Os-Manfvo interface, which provides communication between the OSS/BSS 125 and the Orchestrator function 140.

In other embodiments, the G-CSM function 187 can be instantiated within the network but external to the OSS/BSS 125. In this configuration, another interface, which is may not be defined with the NFV framework, is configured in order to provide communication between the G-CSM function 187 and the Orchestrator function 140.

With further reference to FIG. 1, the various network slices, for example the MBB slice 120 and MTC slice 115, may each include their own network slice specific Connection and Mobility Management (CMM) function 181, 180 and Customer Service Management (CSM) function 186, 185. The network slice specific CMM functions 181, 180 are referred to and controlled by the G-CMM function 182 operating within the Global Control Plane 110. Each network slice further includes a Flow Management (FM)/Traffic Engineering (TE) function 176, 175 which can be configured to tune the performance of the network slice by dynamically analyzing, predicting and regulating behaviour of data transmitted over that network slice. In addition, each of the network slices further includes an Authentication and Authorization (AA) function, which may provide authorization of access of a UE to use of the communication resources of the particular network slice.

In some embodiments, each network slice further includes a network slice specific Infrastructure Management function containing a Spectrum Negotiator function (IM-SN) 191, 190. In some embodiments, the IM-SN function is not contained within the network slice but may instead reside within the Cloud Radio Access Network (C-RAN) functions.

Although only a single Access Point 100 is shown for clarity and illustrated by the "tower icon", it will be readily understood that multiple Access Points are supported. In embodiments, an Access Point throughout the various figures may correspond to one or more Remote Radio Units (RRUs) operatively coupled to one or more Baseband Units (BBUs) or the like.

In accordance with embodiments of the present invention, the NFV-MANO entity 135 further instantiate NFV management plane functions that are used to define the network topology for a Network Service (NS) request; determine the transport protocols to be used across links; and determine the physical links between different network functions used by the network service. In some embodiments, these NFV management plane functions are integrated within the Orchestrator function 140 and include a Software Defined Topology (SDT) function 197, a Software Defined Protocol (SDP) function 196, a Software Defined Resource Allocation (SDRA) function 192 and an Infrastructure Manager (IM) function 194.

SDN is a network management technique that allows a network management entity (e.g. an SDN Controller) to implement an architectural framework to create intelligent programmable networks, where the control planes and the data planes can be decoupled, network intelligence and state are logically centralized, and the underlying network infrastructure is abstracted from the application. In embodiments of the present invention, the Orchestrator function may use customer information and provide information to form a network logical topology, for example as created via the Software Defined Topology (SDT) function. The SDT function can be combined with the SDN and Software Defined Protocol (SDP) function to create a customized virtual network, wherein a virtual network is a collection of resources virtualized for a particular service.

According to embodiments, the SDT function 197 is instantiated as part of the Orchestrator function 140. The SDT function 197 is configured to determine the Point of Presence (PoP) for each VNF in the VNF Forwarding Graph (VNFFG) provided by the G-CSM function 187. The SDT function 197 is also configured to determine the logical links between the VNFs in the VNFFG.

According to embodiments, the SDRA function is configured to allocate physical link resources for each logical link defined in the VNFFG. The SDRA function may rely upon other functional components, such as the SDN Controller (SDN-C) function 193 and the Traffic Engineering (TE) function 195. The SDN-C function 193 is instantiated within each VIM function 193 and is configured to provide the forwarding rules to the forwarding switches, for example routers and the like within the physical network architecture. The 1E function 195 is instantiated within the Orchestrator function 140 and is configured to perform path computation between the source node and destination node while attempting to tune the path by dynamically analyzing, predicting and regulating behaviour of data transmission.

According to embodiments, the SDP function 196 is instantiated as part of the Orchestrator function 140. The SDP function 196 is configured to determine the transport protocol stack for each of the logical links defined in the VNFFG.

Figure 2:
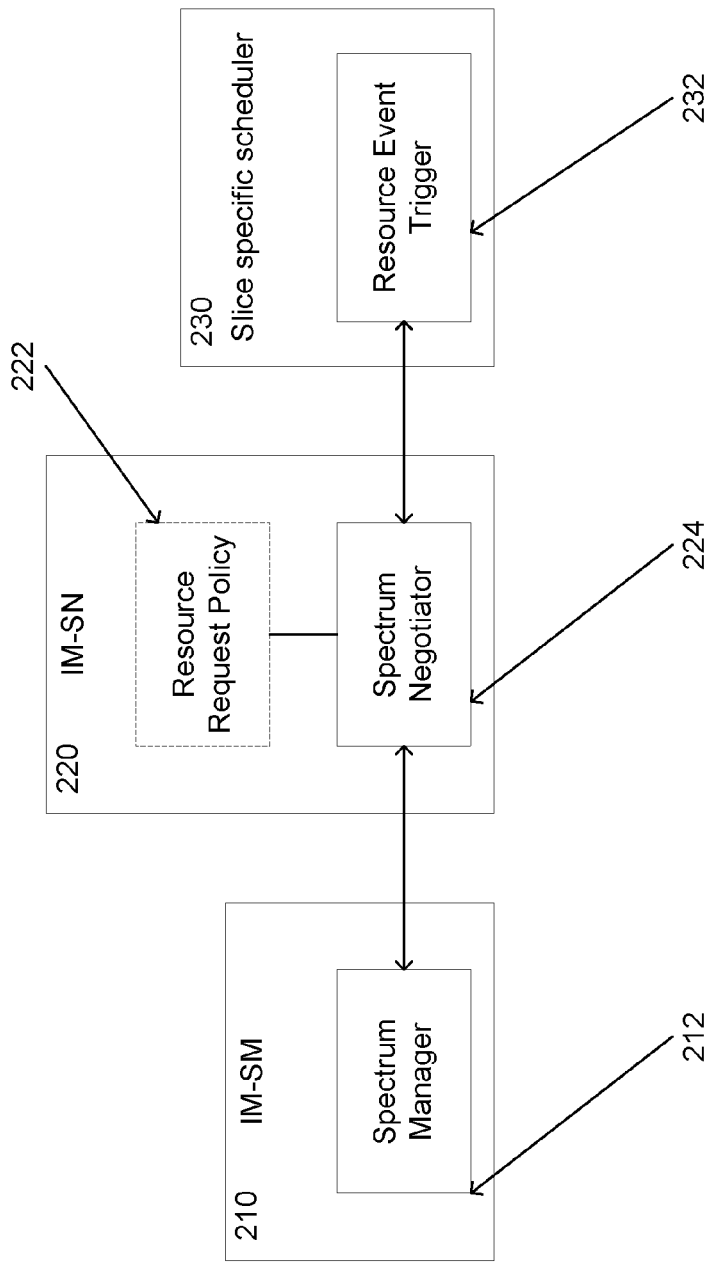
FIG. 2 illustrates a system for virtual infrastructure management including an Infrastructure Management Spectrum Negotiator, and Infrastructure Management Spectrum Manager and a Slice Specific Scheduler in accordance with embodiments of the present invention.

Having discussed an overview of a communication architecture to which the spectrum resource management system can be applied, FIG. 2 illustrates a system for virtual infrastructure management and in particular to spectrum resources management and distribution, according to embodiments of the present invention. The system comprises an Infrastructure Management Spectrum Negotiator (IM-SN) function 220 communicatively coupled to an Infrastructure Management Spectrum Manager (IM-SM) function 210, and a Slice Specific Scheduler (SSS) function 230. For example, the IM-SN function 220 may be instantiated or deployed on infrastructure corresponding to a specific network slice that requires additional resources. The IM-SM function 210 may be deployed or instantiated on a Global Control Plane 110, at an Access Point 100 or other location within the infrastructure of the communication network. The IM-SM function 210 is capable of the provision and distribution of additional spectrum resources which are available to the network operator. The SSS function 230 may be instantiated within the specific network slice with which it is associated or as a separate function within the communication network. The IM-SM function 210 comprises a Spectrum Manager (SM) function 212. The IM-SN function 220 comprises a Resource Request Policy function 222 and a Spectrum Negotiator (SN) function 224. The SSS function 230 comprises a Resource Event Trigger function 232.

In operation, the SN function 224 of IM-SN function 220 may receive a trigger for additional spectrum resources from the Resource Event Trigger function 232 of the SSS function 230. A resource event trigger can be a result of a request for access to the communication network, wherein this request necessitates an increase in the spectrum resources for the particular network slice with which the Slice Specific Scheduler function is associated. For example, the Slice Specific Scheduler function is processing and scheduling plural communication services for the particular network slice in order to provide network access and communication which is requested by an Access Point. However, due to a limited amount of spectrum resources available to the particular network slice, the SN function 224 requests additional spectrum resources from the SM function 212 of IM-SM function 210. The SM function 212 may automatically grant the request, or conditionally grant the request, for example, upon confirmation that the Resource Event Trigger function 232 has been triggered, to indicate that there is a lack of spectrum resources. In some embodiments, the SN function 224 may further consult with the Resource Request Policy function 232 prior to sending the request. The Resource Request Policy function 232 can provide parameters for the negotiation for further spectrum resources by the Spectrum Negotiator function with the Spectrum Manager function. For example, the parameters can relate to priority of spectrum resource assignment within the specific network slice, spectrum resource limits for particular types of communication, (for example emergency communication or voice communication) and the like.

Figure 3:
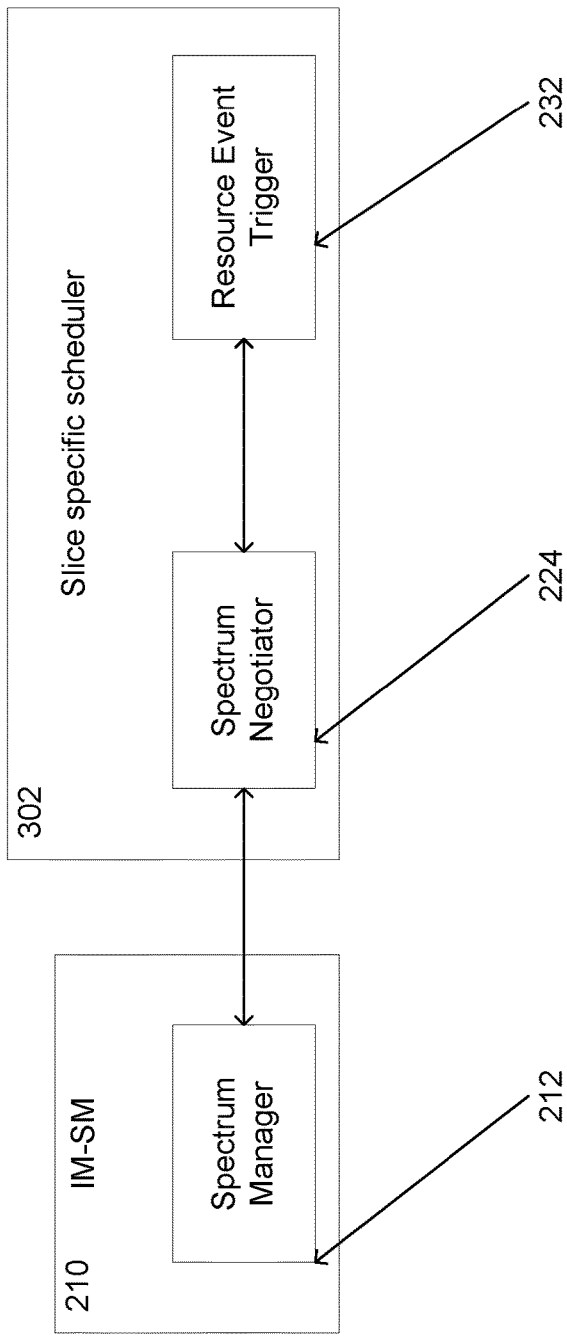
FIG. 3 illustrates a system for virtual infrastructure management including an Infrastructure Management Spectrum Manager and a Slice Specific Scheduler having internal Spectrum Negotiator and Resource Event Trigger functions in accordance with embodiments of the present invention.

Referring to FIG. 3, a system for virtual infrastructure management and in particular to spectrum resources management and distribution, according to embodiments of the present invention is illustrated. The system comprises an Infrastructure Management Spectrum Manager (IM-SM) function 210 communicatively coupled to a Slice Specific Scheduler (SSS) function 302. The IM-SM function 210 comprises a Spectrum Manager (SM) function 212. When compared with FIG. 2, in the embodiment illustrated in FIG. 3, the SSS function 302 comprises a Spectrum Negotiator (SN) function 224 and a Resource Event Trigger function 232.

In operation, the SN function 224 may receive a trigger from the Resource Event Trigger function 232 when additional spectrum resources are required. The SN function 224 can request spectrum resources from the SM function 212 of IM-SM function 210. The SM function 212 may automatically grant the request, or conditionally grant the request, for example, upon confirmation that the Resource Event Trigger function 232 has been triggered, to indicate that there is a lack of spectrum resources. In some embodiments, the SN function 224 may further consult with the Resource Request Policy function prior to sending the request.

In some embodiments, the SN function 224 and Resource Request Policy function may be instantiated on the same network node, or they may be instantiated on separate network nodes as component functions. Further, the SM function 212 and SN function 224 may each correspond to different network nodes, and may each refer to different Resource Request Policy functions for negotiating spectrum resources. The different Resource Request Policy functions may be internal to each network node, or deployed as separate VNFs.

Figure 4:
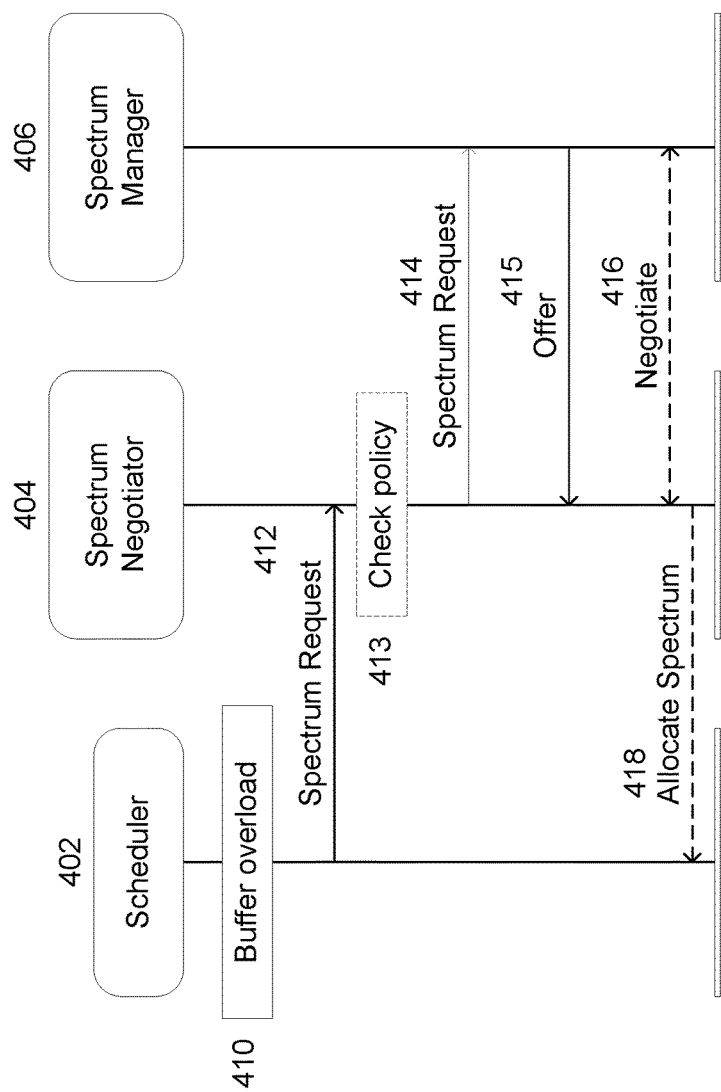
FIG. 4 illustrates a signalling flow chart illustrating a method for negotiating spectrum resources in accordance with embodiments of the present invention.

FIG. 4 illustrates a signalling flow chart of a method for managing spectrum resources in accordance with embodiments of the present invention. The signalling flow chart of FIG. 4 may be applied to one or more of the systems illustrated herein. The Scheduler 402 associated with a network slice determines that more spectrum is needed. There are a number of different mechanisms that can be used to make this determination. As illustrated in FIG. 4, one such mechanism is that the scheduler 402 detects an overload of the allocated spectrum resources. This may take the form of detecting a Buffer overload 410, which can indicate that additional spectrum resources are required. The Scheduler 402 sends a Spectrum Request 412 to the SN function 404, for example, via a Resource Event Trigger function. The SN function 404 can check a policy, for example, through a Resource Request Policy function 413. If the policy permits spectrum sharing, the SN function 404 proceeds to send a request for additional spectrum resources 414 to the SM function 406. The SM function 406 can send an offer 416 to provide at least some of the requested additional spectrum resources for the particular network slice. These additional spectrum resources are resources that are available to a particular network operator, for example spectrum that is owned, leased, borrowed or otherwise available to the network operator. In some embodiments, the SN function 404 and SM function 406 can negotiate 416 for these additional spectrum resources. Upon acceptance of the offer, or in some cases successful negotiation for at least some of the additional spectrum resources, the SN function 404 allocates 418 the offered or negotiated spectrum resources to the Scheduler 402.

According to embodiments, an indication of an overload of spectrum resources assigned to a particular network slice can be one or more of a plurality of detectable conditions. For example an indication can be a detected overload at a buffer of a scheduler which provides for the scheduling and assignment of spectrum resources to particular communication transmissions. In some embodiments, transmissions to and from mobile devices served by a slice can have a predictable pattern. As an example, an MTC slice may serve MTC devices that generate predictable traffic at fixed intervals. Between these intervals, the resources allocated to the MTC slice may be constricted. In anticipation of a spike in traffic, the IM-SN in the MTC slice may request an increase in the spectrum allocation for a fixed period of time. Other predictably periodic spectrum needs will be understood by those skilled in the art. Other indications can include the transmission queue length, or other indication as would be readily understood by a worker skilled in the art. In some embodiments, it may be discovered that certain conditions, when observed, serve as predictors of increased network traffic. For example, when a v2x service receives an indication that there is an accident on a highway, there may be a related increase in the MBB slice traffic resulting from idled drivers using their mobile devices. This detection of an event may also serve as an indication that additional spectrum resources may be needed. In addition, the requirement of additional spectrum resources based on queue length can depend on the type of communication device being serviced by the particular network slice. For example, latency of transmission for an MTC device may be of a lesser concern due to the type of information being transmitted over the communication network, and thus a longer queue length may be acceptable when compared to a queue length for a voice communication transmission. As such, an indication of an overload of spectrum resources may further be dependent on the type of network slice in question.

In some embodiments, if an indication is received that particular spectrum resources which are allocated to a particular network slice are underutilized, the spectrum negotiator of that particular network slice can send a notification to the spectrum manager indicating that these spectrum resources are available for provisioning and redistribution to other network slices.

Figure 5:
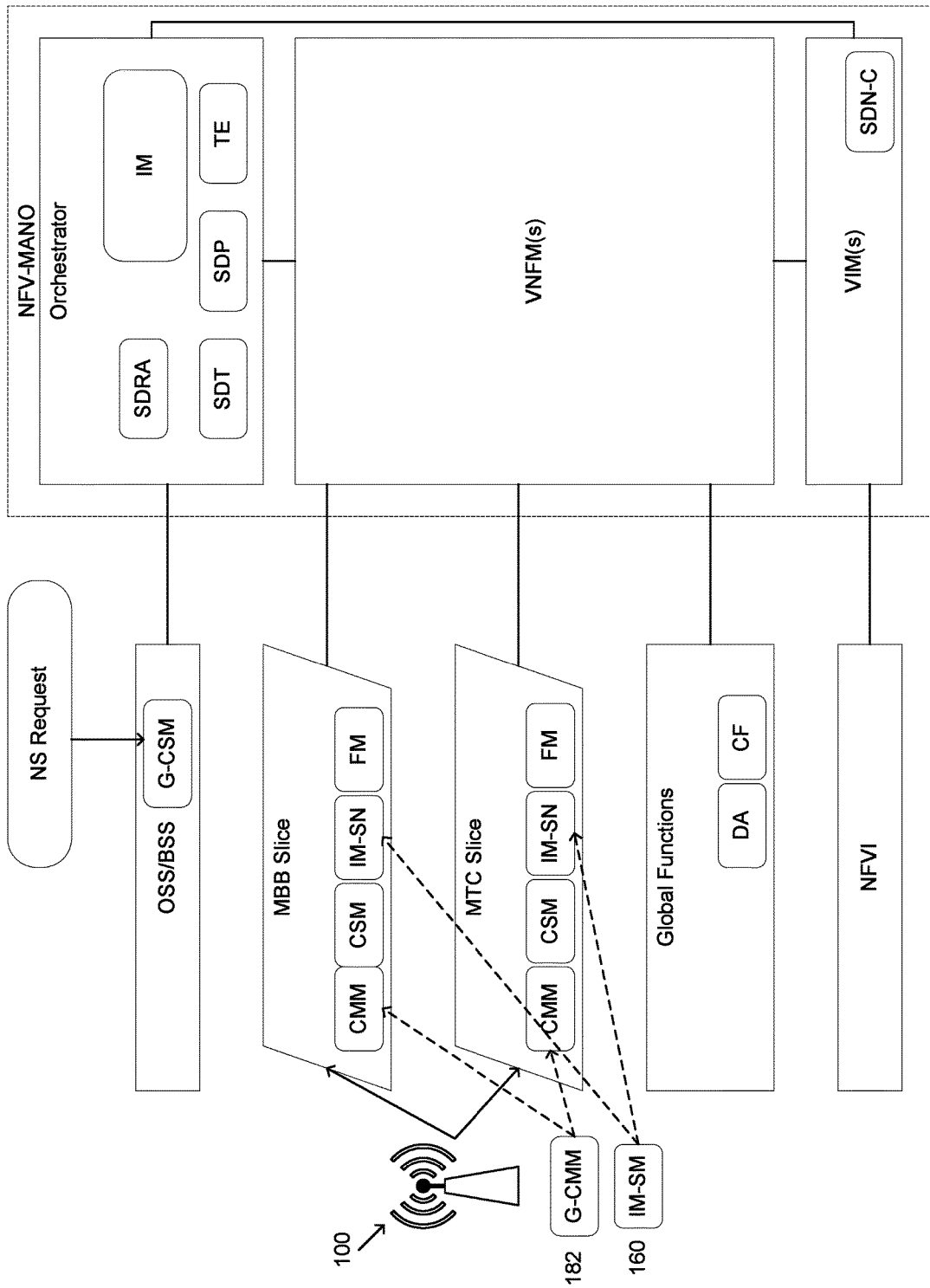
FIG. 5 illustrates an overview of a communication network architecture in accordance with embodiments of the present invention.

With reference to FIG. 5, the network components are the same as has been described above with respect to FIG. 1, however the G-CMM function 182 which controls the CMM function of each of the plural network slices can be removed from the Global Control Plane 110 and instantiated within the Access Point 100. In this embodiment, the IM-SM function 160 can also be instantiated within the Access Point 100 along with the G-CMM function 182.

Figure 6:
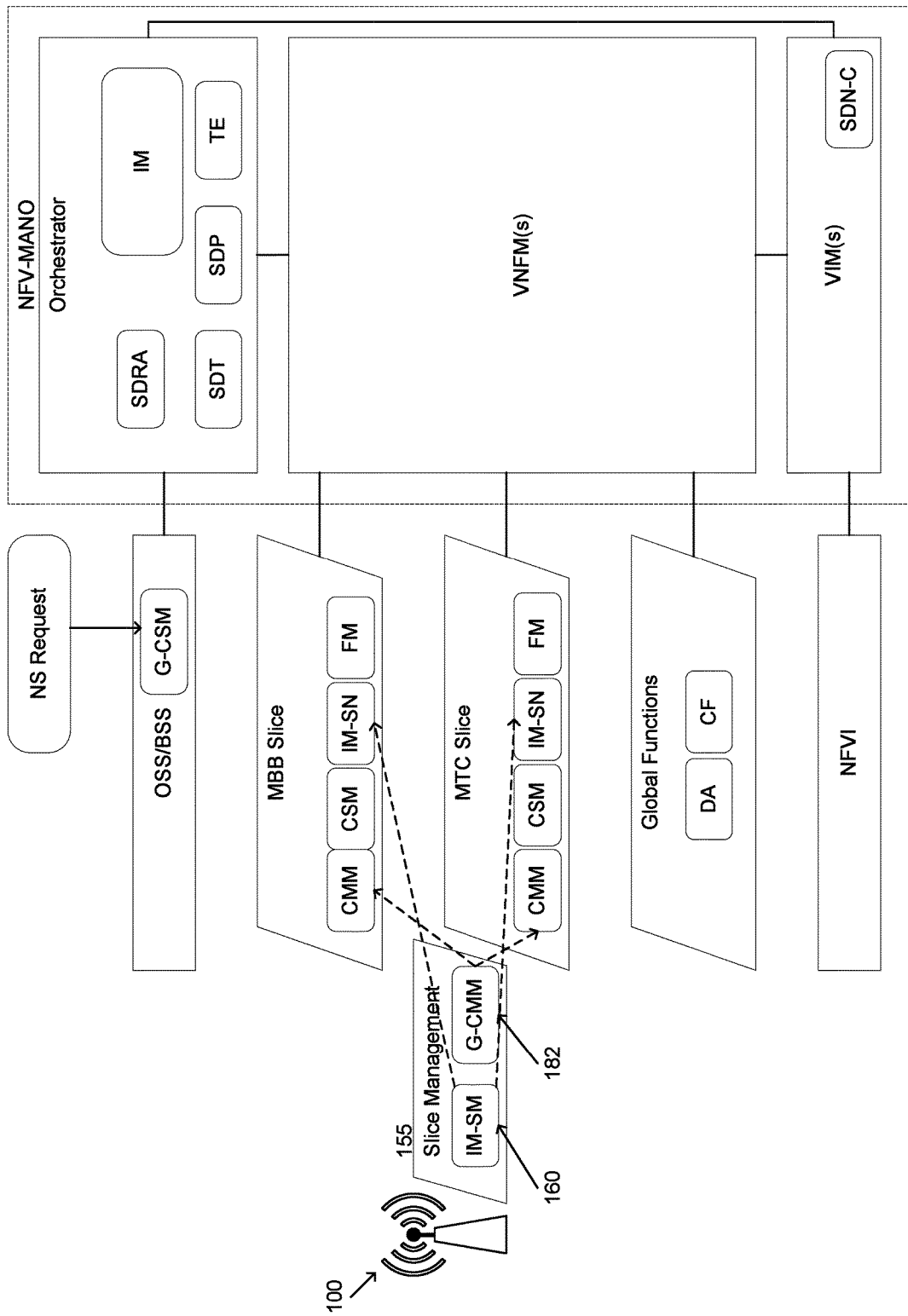
FIG. 6 illustrates an overview of a communication network architecture in accordance with embodiments of the present invention.

With reference to FIG. 6, again the network components are the same as has been described above with respect to FIG. 1, however a Slice Management control plane 155 (or a collection of slice management control plane functions) such as the G-CMM function 182 and the IM-SM function 160, is instantiated at another location within the network architecture. This location is illustrated as being separated from the Access Point 100 and the Global Control Plane 110.

In some embodiments, the IM-SN and IM-SM, and thus SN and SM, may be applied to cover other types of Radio Access Technologies (RATs), for example, WiFi, unlicensed cellular frequency bands, and the like.

It will be readily understood that, throughout the preceding discussion, the above-described network function and their operation may correspond to a method for use in supporting operation a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 7:
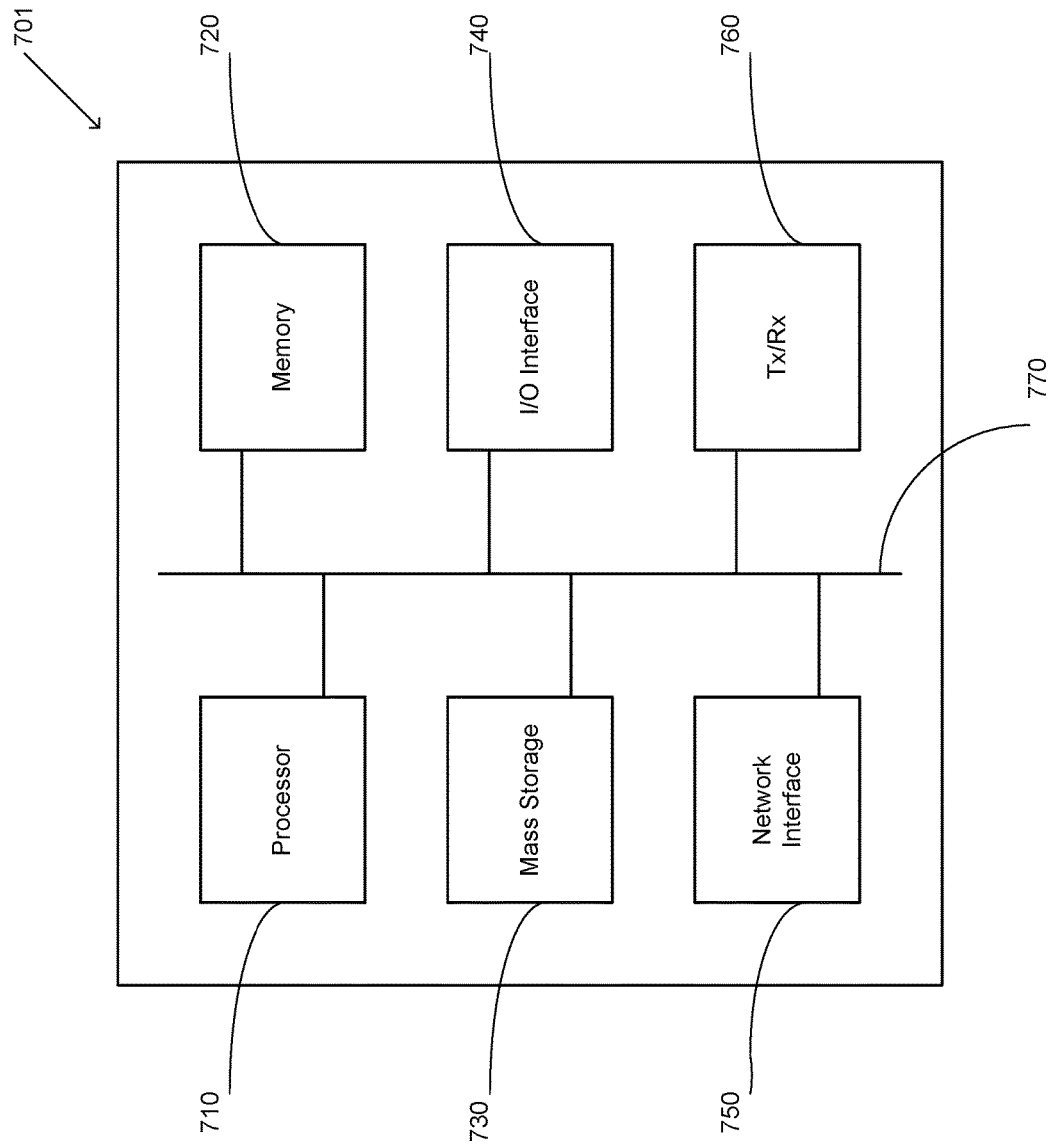
FIG. 7 illustrates a block diagram of a processing system that may be used for implementing the various network elements which instantiate a Spectrum Manager function or a Spectrum Negotiator function in accordance with embodiments of the present invention.

FIG. 7 is a block diagram of a processing system 701 that may be used for implementing the various network elements which instantiate the functions defined herein, for example a Spectrum Manager function or a Spectrum Negotiator function. As shown in FIG. 7, processing system 710 includes a processor 710, working memory 720, non-transitory storage 730, network interface, I/O interface 740, and depending on the node type, a transceiver 760, all of which are communicatively coupled via bi-directional bus 770.

According to certain embodiments, all of the depicted elements may be utilized, or only a subset of the elements. Further, the processing system 710 may contain multiple instances of certain elements, such as multiple processors, memories, or transceivers. Also, elements of processing system 710 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements an instructions executable by the processor for performing the aforementioned functions and steps of plural components defined above, for example, the Global Control Plane, the Spectrum Negotiator and the Spectrum Manager.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include a compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for provisioning and distributing spectrum resources in a communication network, the method comprising:
    receiving, at a spectrum negotiator, a request for additional spectrum resources for a particular network slice;
    transmitting, by the spectrum negotiator, the request for additional spectrum resources to a spectrum manager in response to determining a resource request policy permits sharing of spectrum resources; and
    in response to the transmitted request, receiving, at the spectrum negotiator, an offer for at least some of the requested additional spectrum resources.

2. The method of claim 1, further comprising allocating at least some additional spectrum resources to the particular network slice.

3. The method of claim 1, wherein the resource request policy provides parameters regarding distribution of the additional spectrum resources.

4. The method of claim 1, further comprising negotiating to obtain the at least some of the requested additional spectrum resources.

5. A system for provisioning and distributing spectrum resources in a communication network, the system comprising:
    a spectrum negotiator configured to transmit a request for additional spectrum resources in response to receiving, from a resource request policy function operatively connected with the spectrum negotiator, an indication that the resource request policy function permits sharing of spectrum resources, the spectrum negotiator operatively connected with a particular network slice; and
    a spectrum manager configured to: receive and act upon the request; and provision at least some of the requested additional spectrum resources.

6. The system of claim 5, wherein the spectrum negotiator is instantiated within the particular network slice.

7. The system of claim 5, wherein the spectrum negotiator is instantiated within an access point communicatively connected with the particular network slice.

8. The system of claim 5, wherein the spectrum negotiator is instantiated within the communication network separate from the particular network slice and separate from an access point communicatively connected with the particular network slice.

9. The system of claim 5, wherein the resource request policy function provides parameters regarding distribution of the at least some of the additional spectrum resources.

10. The system of claim 5, wherein the spectrum negotiator and the spectrum manager are configured to negotiate the provision of the at least some of the requested additional spectrum resources.

* * * * *

UNITED STATES PATENT AND TRADEMARK OFFICE
CERTIFICATE OF CORRECTION

PATENT NO. : 10,313,887 B2
APPLICATION NO. : 15/168411
DATED : May 31, 2016
INVENTOR(S) : Sophie Vrzic, Hang Zhang and Nimal Gamini Senarath It is certified that error appears in the above-identified patent and that said Letters Patent is hereby corrected as shown below:

In the Specification

Column 8, Line 55:
"The 1E function 195 is instantiated within the Orchestrator"
Should Read:
--The TE function 195 is instantiated within the Orchestrator--

Signed and Sealed this
Tenth Day of December, 2019

Andrei Iancu
*Director of the United States Patent and Trademark Office*